Jan. 1, 1935.　　　　G. M. CROSS　　　　1,986,503
BRAKE CONTROLLING MECHANISM AND THE LIKE
Filed Feb. 10, 1933
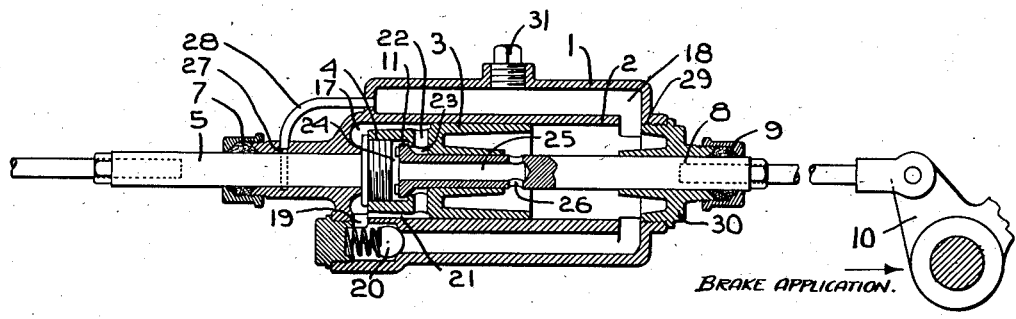
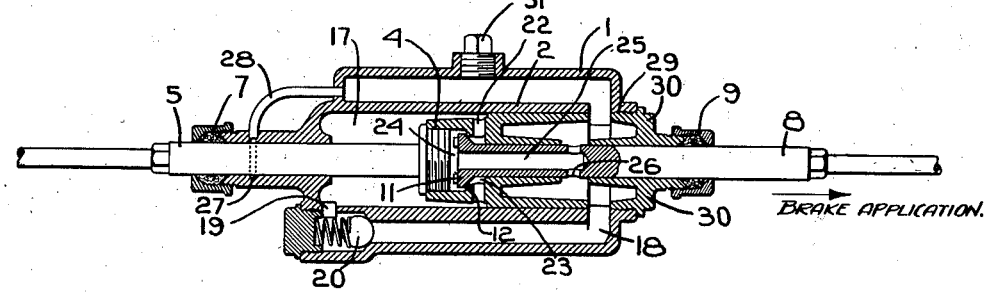
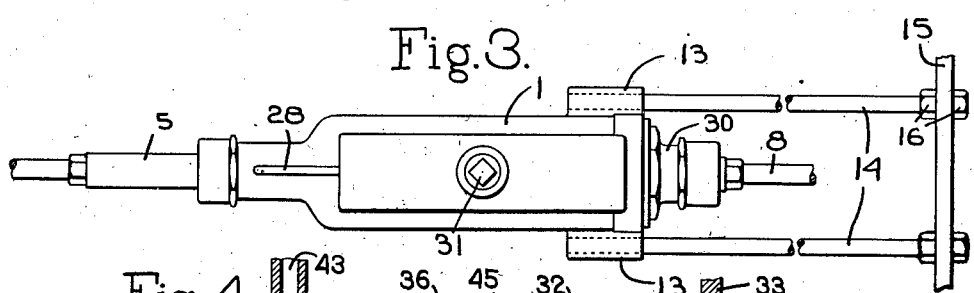
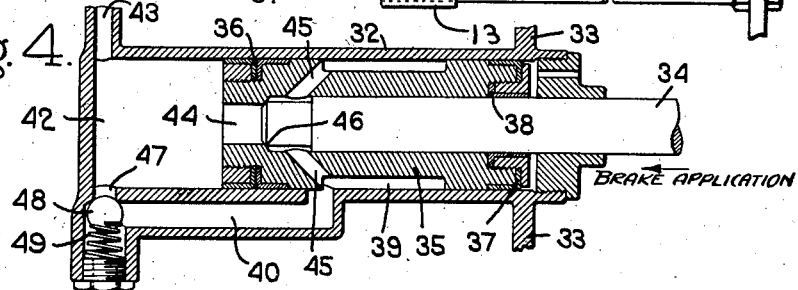
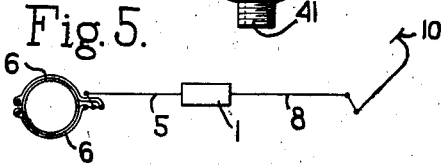
Inventor.
Grosvenor M. Cross
by Heard Smith & Tennant.
Attys.

Patented Jan. 1, 1935

1,986,503

UNITED STATES PATENT OFFICE 1,986,503

BRAKE CONTROLLING MECHANISM AND THE LIKE

Grosvenor M. Cross, Brookline, Mass.

Application February 10, 1933, Serial No. 656,080

7 Claims. (Cl. 188—265)

This invention relates to an apparatus for maintaining an applied force by a lesser force than the applying force and also for reducing the applied force when the lesser force is reduced. Its particular application is especially useful where an applied force, and especially one resulting from a manually exerted applying force, must be maintained during an appreciable period of time.

In the operation of motor vehicles, for example, frequent stops must be made in dense traffic. Many of the stops made are of appreciable duration such as when stopping at traffic lights, upon signal of a traffic officer, or upon an incline. During such stops it is customary to use the foot brake of the vehicle to prevent slipping forward or backward. To prevent such motion of the vehicle, substantially full pressure must be maintained upon the brake pedals. The energy thus expended very soon tires the muscles.

It is the general object of this invention to provide means for maintaining an initially applied force upon the brake of a vehicle or upon other similar devices by the continued application of a small fraction of the applying force upon the brake actuator.

A further object of the invention is to provide a mechanism of the character described in which the force is applied by a positive connection between the point where the applying force is exerted and the point where it is applied.

A further object of the invention is to provide a mechanism of this character which acts by means of controlled hydraulic pressure to maintain, reduce, and release the applied forces.

A further object of the invention is to provide in a mechanism of the character set forth a valve which acts to control the hydraulic pressures obtained during the operation thereof.

A further object of the invention is to provide a mechanism of this character in which the valve controlling the hydraulic pressures is slightly unbalanced by the retaining pressure developed therein tending to open the valve automatically upon the reduction or removal of the applying force.

A further object of the invention is the embodiment of the principles thereof in a brake or similar mechanism in which the applying force is exerted through fluid or hydraulic medium.

Other objects and features will more fully appear from the accompanying specification and drawing and will be particularly pointed out in the claims.

In the drawing:

Fig. 1 is a longitudinal section through the device showing the parts in their inactive state.

Fig. 2 is a longitudinal section similar to Fig. 1 in which the parts are shown in their relative positions after a force has been applied.

Fig. 3 is a plan view of the device illustrating a method of securing the hydraulic cylinder.

Fig. 4 is a longitudinal section through another form of the device suitable for an hydraulic brake system.

Fig. 5 is a diagrammatic view showing the location of the device shown in Figs. 1, 2 and 3 in its application to a brake system in a vehicle.

The principles of the invention may be embodied in numerous forms of mechanism which may be adapted to the particular use desired. In order more clearly to present these principles, two specific devices will be described herein.

The invention is desirably embodied in a unit construction having practically all of its elements within a casing 1. Within the casing is situated a hydraulic cylinder 2 having a piston 3 movable therein. One end of the piston 3 is provided with a threaded aperture 4 within which is received the threaded end of a rod 5 which desirably extends through a packing gland 7 and to the actuated elements which in the particular adaptation of the device herein presented are the brake shoes 6 of a vehicle braking system. The body portion of the piston 3 is axially bored to receive a rod 8. The rod 8 is loosely received in the piston and is capable of a slight longitudinal relative motion therein. The rod 8 extends through a packing gland 9 and connects directly with the point where the applying force is exerted which in the particular instance described is in the form of a brake actuating lever or pedal 10. The inner end of the rod 8 is headed to form a valve 11 which cooperates with a valve seat 12 in the piston.

The casing 1 is fixed with relation to the body of the vehicle. A desirable method of accomplishing this result is to form the casing 1 with a pair of bosses 13 in which are received a pair of rods 14 which extend to some rigid member 15 on the vehicle and are securely bolted thereto by means of the nuts 16. When a force is applied to the brake pedal 10, this force is positively transmitted through the rods 5 and 8 to the brake shoes 6 and during such application of force the piston 3 moves from the position shown in Fig. 1 to that shown in Fig. 2. The chamber 17 to the left of the piston constitutes a pressure chamber and is maintained filled with suitable fluid such as engine oil. The casing 1 is provided with a second chamber 18 which extends to the other side of the piston and which is maintained full of fluid. A conduit 19 communicates from the pressure chamber 17 to the second chamber 18 and has therein a check valve 20 so positioned that it will permit free flow of the fluid from the second chamber 18 to the pressure chamber and prevent flow from the pressure chamber to the second chamber.

A by-pass extends between the pressure chamber 17 and the second chamber 18, and in the preferred form shown extends through the piston 3. This by-pass is desirably composed of longitudinal port 21 communicating with the pressure chamber 17 and radial ports 22 extending inwardly to a chamber 23 in the piston which, during the operation of the mechanism, is closed by the valve 11. When pressure is reduced on the brake pedal, however, the fluid may flow freely past the valve into the chamber 24 in the piston through the port 25 within the rod 8 and thence into the second chamber 18 through radial ports 26. The chamber 24 and the ports 25 and 26 constitute the remaining portion of the by-pass.

In order to guard against loss of fluid from the pressure chamber 17 along the rod 5, an annular chamber 27 is formed in the casing and has communicating therewith a tube 28 which extends to the second chamber 18. Any of the fluid which finds its way along the rod 5 will enter the chamber 27 and be conducted back to the second chamber 18, the packing gland 7 acting also to prevent leakage of fluid.

It is desirable that the valve 11 be positively opened to insure a free flow of fluid through the by-pass in the piston when the applying force is reduced in the brake pedal 10. In order to insure such action, the area of the valve 11 is so proportioned that the pressure in the chamber 17 finding its way through the ports 21, 22 and into the chamber 23 acts continuously to exert a slight force tending to open the valve. This feature of the mechanism, however, is not absolutely necessary to the proper functioning thereof. The valve and its seat may be so designed that the valve will always remain in a balanced condition.

In order to facilitate the machining operations of the cylinder 2, and to provide means for assembling the various elements, the casing 1 is desirably provided with a threaded aperture 29 within which is received a plug member 30 through which the rod 8 extends containing the packing gland 9. The fluid may be supplied in any suitable manner as to the second chamber, which is here shown provided with a suitable filler plug 31.

In the operation of the mechanism, when pressure is applied to the brake pedal 10, the brake shoes 6 are applied to their cooperating brake drums in the usual manner. During such application of the brakes, the piston 3, which normally assumes the position shown in Fig. 1, moves into the position shown in Fig. 2, or approximately such position. During such movement of the piston, fluid is forced into the pressure chamber 17 through the port 19. Since the valve 11 is closed by the pressure on the pedal 10 and the check valve 20 prevents reverse flow of the fluid from the pressure chamber 17, this fluid becomes trapped therein and prevents reverse movement of the piston. So long as the pressure is maintained in the chamber 17, the brakes will remain fully applied. Reverse movement of the piston 3 is now under the complete control of the valve 11. In order to maintain the pressure in the chamber 17, it is only necessary to apply a relatively light force upon the pedal 10 sufficient to maintain the valve 11 in the by-pass closed. When, however, pressure is reduced on the pedal, the valve 11 will open and permit the fluid in the chamber 17 to flow through the by-pass into the second chamber 18, allowing the piston to move and thus to reduce the applied force at the brake. Means are thus provided for maintaining the initially applied pressure upon the brakes by means of a greatly reduced pressure upon the brake pedal from that required to effect the initial brake pressure, thereby greatly reducing the effort required to hold the car in a fixed position over an appreciable period of time, or to maintain the brake applied while slowing down or whenever required.

In the specific embodiment of the invention thus far described, the applying force is exerted through mechanical connections to its point of application, that is, the brake actuator 10 acts through the rods 8 and 5 to apply the brake. In its main features the invention is equally applicable to constructions in which the applying force is exerted through other than mechanical connections. As illustrating such further embodiment of the invention, a mechanism in which the force is exerted through a fluid is illustrated in Figure 4 where a portion of a hydraulic braking mechanism is shown. In this case the casing 32 may be connected to the vehicle frame from the lugs 33 as in the case of the casing 1 and the rod 34 may be connected with the brake actuator as in the case of the rod 8. The casing 32 presents the hydraulic cylinder in which moves the piston 35 and the rod 34 is mounted to reciprocate, and to reciprocate slightly with respect to the piston. The piston is provided at each end with suitable packing glands 36 and 37 to prevent leakage past its exterior surface and also with a packing gland 38 to prevent leakage along the rod 34.

The arrangement of chambers, by-passes, and valves is the same in principle as that already described. The piston is reduced at its middle portion to present between itself and the casing an annular chamber 39 communicating with a chamber 40 in the casing. The chambers 39 and 40 together constitute the pressure chamber and this pressure chamber communicates through a passageway 41 with the brake mechanism. The chamber 42 at the other side of the piston constitutes the second chamber. The second chamber and consequently the other chambers are maintained full of oil by any suitable means, as, for example, through a passageway 43 to a reservoir or filling opening. The by-pass between the second chamber 42 and the pressure chamber 39—40 comprises the port 44 opening centrally through the head of the piston and the radial ports 45 extending therefrom to the chamber 39. The end of the rod 34 is formed to present a valve 46 seating against a surface at the inner end of the port 44. A passageway 47 connects the chamber 40 of the pressure chamber with the second chamber 42 and this passageway is controlled by the check valve comprising the ball 48 and the spring 49. This check valve permits free flow from the second chamber to the pressure chamber but prevents flow of the fluid in the reverse direction.

The operation of this embodiment of the invention will now be apparent. The construction in the drawing is shown in the position in which the applying force has just been applied to the brake actuator. The rod 34 is thus forced to the left, causing the valve 46 to close the by-pass 44—45. As the applying force is exerted, the rod 34 is propelled to the left, thus propelling the piston and forcing the fluid from the second chamber 42 past the check valve, building up pressure in the pressure chamber 40—39, which is in constant communication through the passageway 41, and thus applying the required pressure to the brake. When the desired pressure has been attained, the movement of the piston to the left stops and consequently the check valve 48 closes and the piston remains in this pressure applying position so long as the by-pass 44—45 is closed by the valve 46. Only a very slight fraction of the applying force at the brake actuator is required to hold the rod 34 in position to maintain the valve 46 closed and, whenever this closing force is reduced, the valve 46 opens, thus permitting reverse flow from the pressure chamber through the by-pass 44—45 to the second chamber and correspondingly reducing the applied pressure at the brake.

The invention thus enables an applied force to be maintained by a lesser force than the applying force and also enables the applied force to be reduced whenever the lesser force is reduced. Thus in the particular embodiments of the invention described in connection with vehicle braking mechanisms, the operator is enabled to maintain the brake supplied and control the reduction and release of the application of the brake by a very slight pressure of the foot on the brake-actuating pedal.

Having thus described the invention, what is claimed as new, and desired to be secured by Letters Patent, is:

1. In a vehicle, the combination of a vehicle frame, a brake, a brake actuator and means connected to the frame interposed between the brake actuator and brake acting to transmit to the brake an applying force at the brake actuator and thereafter acting to maintain the force applied to the brake by a predetermined lesser applying force at the brake actuator and acting to reduce the force applied to the brake when said lesser applying force is reduced.

2. In a vehicle, the combination of a brake, a brake actuator, and means interposed between the brake actuator and brake acting to transmit to the brake an applying force at the brake actuator and thereafter acting to maintain the force applied to the brake by a predetermined lesser applying force at the brake actuator and acted upon by the force applied to the brake to reduce the force applied to the brake when said lesser applying force is reduced.

3. A mechanism for maintaining an applied force by a lesser force than the applying force comprising a hydraulic cylinder, a piston movable therein, a pressure chamber at one side of the piston containing fluid, a second chamber containing fluid, a check valve permitting free flow of the fluid from the second chamber to the pressure chamber, a by-pass between the second chamber and pressure chamber, and a valve in the by-pass maintained closed by a fraction of the applying force, opening when said closing force is reduced and thereby acting, when the fluid is forced into the pressure chamber by the piston, to maintain the applied force by the continued application of the valve closing force.

4. A mechanism for maintaining an applied force by a lesser force than the applying force comprising the construction defined in claim 3, in which the by-pass extends through the piston and permits fluid flow therethrough at all positions of the piston when the valve is open.

5. A mechanism for maintaining an applied force by a lesser force than the applying force comprising a hydraulic cylinder, a piston reciprocable therein, a rod extending into and reciprocable longitudinally with and with respect to the piston for transmitting the applying force, a pressure chamber at one side of the piston containing fluid, a second chamber containing fluid, a check valve permitting free flow of the fluid from the second chamber to the pressure chamber, a by-pass extending between the second chamber and pressure chamber and through the piston, and a valve in the by-pass in the piston connected to and operated by the rod, the said mechanism acting, when the rod is propelled by the applying force, to close the valve and propel the piston and force the fluid into the pressure chamber and thereafter acting, when a fraction of the said applying force is operative on the rod, to maintain the valve closed and thus to maintain the applied force resulting from the piston movement and acting upon a reduction of the valve closing force to open the valve and reduce the applied force.

6. A mechanism for maintaining an applied force by a lesser force than the applying force comprising a fixed hydraulic cylinder, a piston movable therein, a pressure chamber at one side of the piston containing fluid, a second chamber containing fluid, a check valve permitting free flow of the fluid from the second chamber to the pressure chamber, a by-pass between the second chamber and pressure chamber extending through the piston, a two-section force-transmitting member, one of said sections being rigidly connected to said piston and extending to the point where the force is applied, and the other section movable within and with respect to the piston and extending to the point where the applying force is exerted, a valve on the latter section acting to open and close the by-pass and to retain the said section in the piston, the said valve being held to its seat by the applying force or a fraction thereof, whereby fluid drawn into and trapped in the pressure chamber upon exertion of the applying force acts to maintain the applied force until the valve in the by-pass is opened.

7. In a vehicle, the combination of a vehicle frame, a brake, a brake actuator, a hydraulic cylinder connected to the frame interposed between the brake actuator and brake, a piston movable in the cylinder, a pressure chamber at one side of the piston containing fluid, a second chamber at the other side of the piston containing fluid, a check valve permitting free flow of fluid from the second chamber to the pressure chamber, a by-pass extending through the piston and connecting the pressure chamber and the second chamber, a tension rod connecting the piston and brake, a valve mounted in the piston for opening and closing the by-pass, an actuating rod connected to the valve and extending through the piston and connected to the brake actuator, the said mechanism acting, when force is applied to the brake actuator, to close the valve in the by-pass and cause the piston to force fluid from the second chamber into the pressure chamber and to apply the brake and the said mechanism thereafter acting, when a fraction of the applying force is exerted on the brake actuator, to maintain the said valve closed and thus to maintain the force applied to the brake and acting upon a reduction of the valve closing force to open the valve and reduce the force applied to the brake.

GROSVENOR M. CROSS.